United States Patent [19]
Yerich

[11] Patent Number: 5,870,857
[45] Date of Patent: Feb. 16, 1999

[54] INSERT FOR FLORAL BOX

[75] Inventor: Frank Yerich, Houston, Tex.

[73] Assignee: Formtex Plastics Corporation, Houston, Tex.

[21] Appl. No.: 824,237

[22] Filed: Jan. 9, 1997

[51] Int. Cl.$^6$ .............................. A01G 9/24; A01G 9/02
[52] U.S. Cl. .................................................. 47/87; 47/75
[58] Field of Search ................... 47/75, 86, 87; 264/113, 245; 428/35.7, 36.92

[56] References Cited

U.S. PATENT DOCUMENTS

| | | | |
|---|---|---|---|
| 1,132,210 | 3/1915 | Poessel | 47/75 |
| 3,791,899 | 2/1974 | Walters | 264/113 |
| 4,291,494 | 9/1981 | Knablein et al. | 47/87 X |
| 4,773,182 | 9/1988 | Weder et al. | 428/35.7 |
| 4,882,173 | 11/1989 | LaRoche | 264/245 |
| 5,174,061 | 12/1992 | Dambricourt | 47/75 X |
| 5,363,592 | 11/1994 | Weder et al. | 47/75 X |

OTHER PUBLICATIONS

Bill Hammond Promotions, Plantpak Grower Products, pp. 1 and 2., Dec. 1980.

*Primary Examiner*—Michael J. Carone
*Assistant Examiner*—Elizabeth Shaw
*Attorney, Agent, or Firm*—Wendy K. Buskop; Chamberlain, Hrdlicka et al

[57] ABSTRACT

The method and apparatus include an insert for increasing the aesthetic value of a floral box. The insert has a bottom wall being substantially rectangular in shape, a first end wall and a second end wall. The first end wall is parallel and equal in length to the second end wall. The first end wall and the second end wall extend from the bottom wall. There is a first side wall and a second side wall. The first side wall is parallel and equal in length to the second side wall. The first side wall and the second side wall extend from the bottom wall. The first end wall, the second end wall, the first side wall and the second side wall diverge away from the bottom wall. The insert is made from a colored plastic material. The insert is formed by placing a piece of plastic on a heated mold that has the desired shape.

10 Claims, 3 Drawing Sheets

INSERT FOR FLORAL BOX

BACKGROUND OF THE INVENTION

The present invention relates to a plastic insert that enhances the beauty of existing floral boxes.

Currently, the floral industry distributes its wares in a variety of clear rectangular shaped plastic boxes. Clear plastic is typically used so the recipient of the flowers can see them through the box. Millions of dollars are spent annually on the purchase of plastic flower boxes alone. A more aesthetic way of presenting the flowers would be desirable to both the purchaser and the seller.

OBJECTS OF THE INVENTION

It is an object of the present invention to provide an insert that can be used with any floral box to enhance the beauty of the flowers.

It is another object of the present invention to provide a floral box with a colored insert that enhances the beauty of the flowers.

SUMMARY OF THE INVENTION

In the present invention, there is provided an insert for increasing the aesthetic value of a floral box as shown in FIGS. 1–10. The insert has a bottom wall being substantially rectangular in shape, a first end wall and a second end wall. The first end wall is parallel and equal in length to the second end wall. The first end wall and the second end wall extend from the bottom wall. There is a first side wall and a second side wall. The first side wall is parallel and equal in length to the second side wall. The first side wall and the second side wall extend from the bottom wall. The first end wall, the second end wall, the first side wall and the second side wall diverge away from the bottom wall. The insert is made from a colored plastic material.

In another embodiment of the present invention, there is provided a floral box with a colored insert. The floral box has substantially the same shape as the insert however, the floral box has a protrusion on the outer edge of the box that runs parallel to the bottom wall of the box. The floral box also has a locking means to hold the box in the closed position.

In yet another embodiment of the present invention, there is provided a method for enhancing a clear plastic floral box. The method comprises the steps of heating a mold that is substantially the same shape as an inside surface of a plastic floral box. A colored plastic material is placed on the mold. A colored insert is then formed in the shape of the mold from the colored plastic material. The colored insert is placed inside the clear plastic floral box. The box is now ready for whatever flower arrangement the customer desires.

DETAILED DESCRIPTION OF THE PREFERRED EMBODIMENTS

Figure 1:
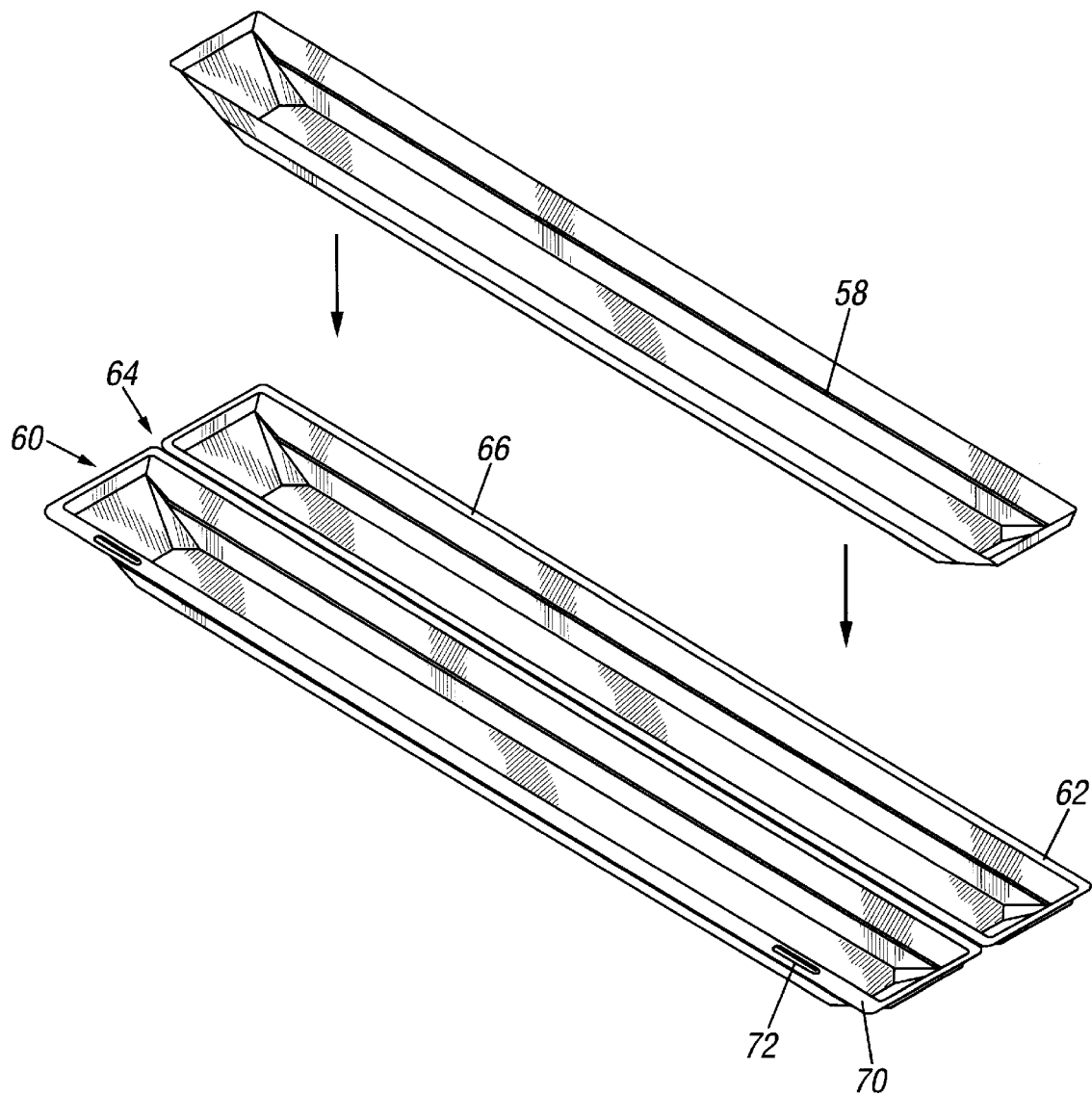
FIG. 1 is an exploded view of the insert and the floral box.
Figure 2:
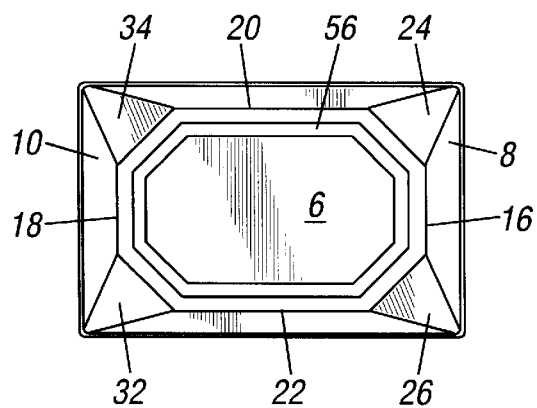
FIG. 2 is a bottom perspective view of an insert.
Figure 3:
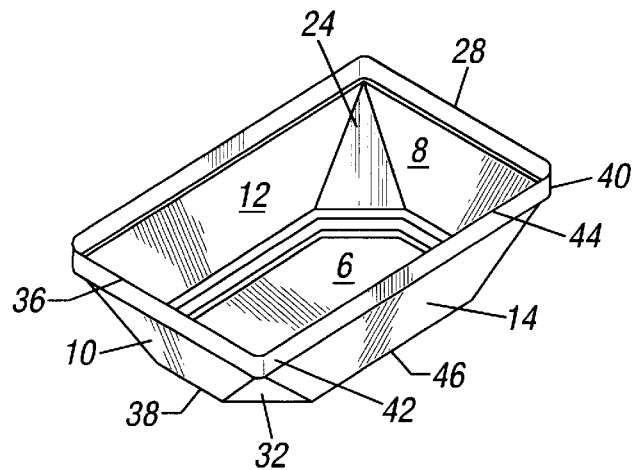
FIG. 3 is a perspective view of an insert.
Figure 4:
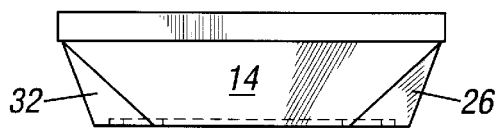
FIG. 4 is a side view of an insert.
Figure 5:
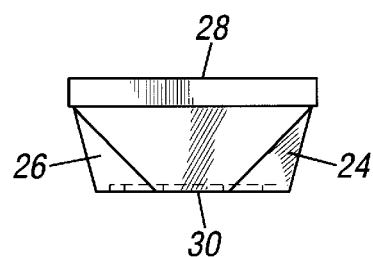
FIG. 5 is an end view of an insert.
Figure 6:
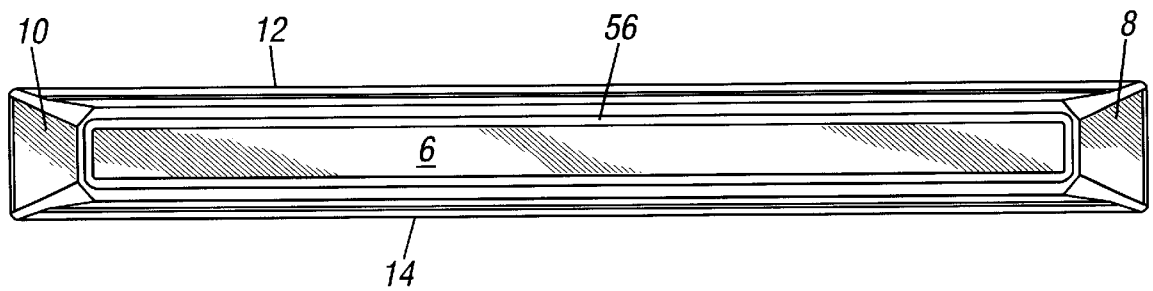
FIG. 6 is a bottom perspective view of the insert shown in FIG. 1.
Figure 7:
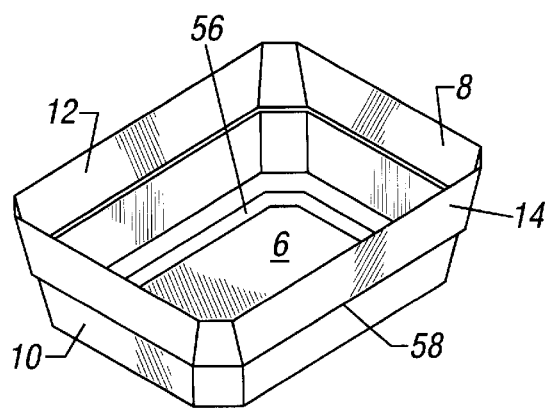
FIG. 7 is a perspective view of an insert.
Figure 8:
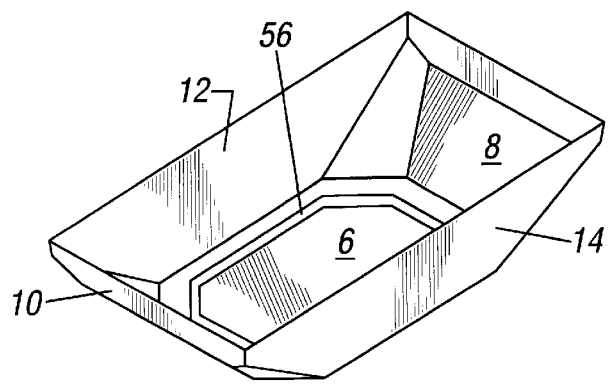
FIG. 8 is a perspective view of an insert.

In the present invention, there is provided an insert 2 for a floral box 4 as shown in FIGS. 1–8. In the Figures, like numbered elements of the drawings are the same. The insert 2 has a bottom wall 6 being substantially rectangular in shape, a first end wall 8 and a second end wall 10. The first end wall 8 is parallel and equal in length to the second end wall 10. The first end wall 8 and the second end wall 10 extend from the bottom wall 6. There is a first side wall 12 and a second side wall 14. The first side wall 12 is parallel and equal in length to the second side wall 14. The first side wall 12 and the second side wall 14 extend from the bottom wall 6. The first end wall 8, the second end wall 10, the first side wall 12 and the second side wall 14 diverge away from the bottom wall 6. The insert 2 is made from a colored plastic material.

Generally, the insert can be made in the same dimensions and shape of most commonly available clear plastic floral boxes. In a preferred embodiment, the bottom wall 6 has a first end 16 and a second end 18, a first side edge 20 and a second side edge 22. The first end wall 8 has a first end portion 24, a second end portion 26, a top edge 28, and a bottom edge 30. The first end 16 of the bottom wall 6 is connected to the bottom edge 30. (See FIGS. 2–5)

Likewise, the second end wall 10 has a first end portion 32, a second end portion 34, a top edge 36 and a bottom edge 38 and the second end 18 of the bottom wall 6 is connected to the bottom edge 38.

The first side wall 12 has a first end 40, a second end 42, top edge 44, and a bottom edge 46. The first end portion 24 of the first end wall 8 connects the first end 40 of the first side wall 12 to the first end wall 8, the first end portion 32 of the second end wall 10 connects the second end 42 of the first side wall 12 to the second end wall 10 and the bottom edge 46 is connected to the first side edge 20 of the bottom wall 6.

The second side wall 14 has a first end 48, a second end 50, top edge 52, and a bottom edge 54, wherein the second end portion 26 of the first end wall 8 connects the first end 48 of the second side wall 14 to the first end wall 8, and the second end portion 34 of the second end wall 10 connects the second end 50 of the second side wall 14 to the second end wall 10 and the bottom edge 54 is connected to the second side edge 22 of the bottom wall 6. Preferably, each of the side walls has a shoulder 58 extending the length of each of the sidewalls.

Preferably, the first end portion 24 and the second end portion 26 of the first end wall 8 diverge away from the bottom wall 6 at a greater angle than each of the side walls, and the top edge 28 of the first end wall 8 diverges at an angle generally normal to the bottom wall 6. The first end portion 32 and the second end portion 34 of the second end wall 10 diverge away from the bottom wall 6 at a greater angle than each of the side walls, and the top edge of the second end wall 10 diverges at an angle generally normal to the bottom wall 6. Preferably, the bottom wall 6 forms an elongated octagon and a rib 56 extends around the periphery of the bottom wall 6. The end portions of each of the end walls can be triangular or trapezoidal.

In another preferred embodiment, the colored plastic material can be one of many polymers such as: high impact polystyrene, polyvinyl chloride, and poly ethylene terephthalate glycol. High impact polystyrene can be purchased in a variety of colors from Fina Oil and Chemical of Dallas, Tex. or Pace Industries of Reedsburg, Wis. and has a thickness of from between 0.002 and 0.030 inches. Polyvinyl chloride can be purchased from Nan Ya Plastics of Wharton, Tex. The poly ethylene terephthalate glycol can be purchased from Eastman Chemical Co. of Kingsport, Tenn.

The thickness can vary, depending on the plastic used, from between 0.002 and 0.030 inches. Preferably, the plastic is about 0.030 inches in thickness and can be as thin as 0.001 inches.

The plastic used to make the insert can be colored and transparent or colored and opaque depending on the desired end use. The plastic used can be metallic in nature to present a shiny reflective surface for the flowers to be placed on. The plastic can be coated with a metallic substance to give it the desired color. The inserts can also be coated with materials such as felt or pearl to correspond with the appropriate floral arrangement.

The inserts can be any number of dimensions, in order to fit into the existing floral boxes. Each of the end walls can be from between approximately 3" and 4" in length; and each of the side walls are from between approximately 4" and 7" in length; and the insert 2 is from between approximately 1" and 2" in height. In another embodiment, each of the end walls can be from between approximately 1" and 4" in length; and each of the side walls are from between approximately 19" and 32" in length; and the insert 2 is from between 1" and 3" in height. In yet another configuration, each of the end walls can be approximately 4⅝" in length; and each of the side walls are approximately 8½" in length; and the insert 2 is approximately 2" in height. In a preferred embodiment, each of the end walls are approximately 2" in length; and each of the side walls are approximately 19" in length; and the insert 2 is approximately 1" in height.

In another embodiment of the present invention, there is provided, a floral box having a lower half 60 connected to an upper half 62 by a hinge means 64. (See FIG. 1) The upper half 62 has a bottom wall 6 being substantially rectangular in shape, a first end wall 8 and a second end wall 10, the first end wall 8 being parallel and equal in length to the second end wall 10, wherein the first end wall 8 and the second end wall 10 extend from the bottom wall 6 as described above. There is a first side wall 12 and a second side wall 14. The first side wall 12 is parallel and equal in length to the second side wall 14. The first side wall 12 and the second side wall 14 extend from the bottom wall 6. The first end wall 8, the second end wall 10, the first side wall 12 and the second side wall 14 diverge away from the bottom wall 6.

There is a peripheral portion 66 extending away from and in a plane parallel to the bottom wall 6. The lower half 60 is substantially the same as the upper half 62 and further comprises a locking means. A colored insert 2 as described above, nests in and conforms to the shape of the lower half 60.

Preferable, the locking means is formed by the peripheral portion 66 of the lower half 60 positioned opposite the hinge means 64. The locking means has an upwardly extending skirt 70 attached to the peripheral portion 66 and an inward rib 72 at each end of the skirt to latch the peripheral portion of the upper half 62.

The insert can be made from the materials described above and have similar dimensions so they fit into an existing floral box. The colored plastic used to make the inserts can be opaque, transparent or reflective in nature.

In yet another embodiment of the present invention, there is provided a method for enhancing a clear plastic floral box. The method comprises the steps of heating a mold that is substantially the same shape as an inside surface of a plastic floral box 4. A colored plastic material is placed on the mold. A colored insert 2 is then formed in the shape of the mold from the colored plastic material. The colored insert 2 is placed inside the clear plastic floral box 4. The floral box is now ready for whatever flower arrangement the customer desires.

While only preferred embodiments of the invention have been illustrated and described herein, it is to be understood that many modifications may be made therein without departing from the scope of the invention as set forth in the appended claims.

I claim:

1. A floral box comprising:

a lower half connected to an upper half by a hinge means, said upper half having a bottom wall being substantially rectangular in shape;

a first end wall and a second end wall, said first end wall being parallel and equal in length to said second end wall, wherein said first end wall and said second end wall extend substantially similar oblique angles from said bottom wall;

a first side wall and a second side wall, said first side wall being parallel and equal in length to said second side wall, wherein said first side wall and said second side wall extend at substantially similar oblique angles from said bottom wall, wherein said first end wall is integrally attached to said first side wall, said second side wall and said bottom wall and, said second end wall, is integrally attached to said first side wall, second side wall and said bottom wall;

a peripheral portion extending away from and in a plane parallel to said bottom wall wherein said peripheral portion is integrally connected to said first end wall, said first side wall, said second end wall and said second side wall forming a lip;

said lower half being substantially the same as said upper half, said lower half further comprising a locking means; and a colored insert that nests in and conforms to the shape of the lower half.

2. The floral box as in claim 1, wherein the locking means is formed from the peripheral portion of the lower half positioned opposite the hinge means, and an upwardly extending skirt attached to the peripheral portion and an inward rib at each end of the skirt to latch the peripheral portion of the upper half.

3. The floral box as in claim 1, wherein the colored insert consists of a plastic material which is opaque.

4. The floral box as in claim 1, wherein the colored insert consists of a plastic material which is transparent.

5. The floral box as in claim 1, wherein the colored insert consists of a plastic material selected from the group consisting of: high impact polystyrene, polyvinyl chloride, and poly ethylene terephthalate glycol and wherein said insert has a thickness between 0.002 and 0.030 inches.

6. The floral box as in claim 1, wherein each of the end walls are between approximately 3" and 4" in length; and each of the side walls are between approximately 4" and 7" in length; and the insert is approximately 1" and 2" in height.

7. The floral box as in claim 1, wherein each of the end walls are between approximately 1" and 4" in length; and each of the side walls are between approximately 19" and 32" in length; and the insert is between 1" and 3" in height.

8. The floral box as in claim 1, wherein each of the end walls are approximately 4⅝" in length; and each of the side walls are approximately 8½" in length; and the insert is approximately 2" in height.

9. The floral box as in claim 1, wherein each of the end walls are approximately 2" in length; and each of the side walls are approximately 19" in length; and the insert is approximately 1" in height.

10. A method for enhancing a clear plastic floral box, said method comprising:

heating a mold that is substantially the same shape as an inside surface of a plastic floral box;

placing a colored plastic material selected from the group consisting of high impact polystyrene, polyvinyl chloride and polyethylene terephthalate glycol of a thickness of between 0.002 and 0.30 inches on the mold;

forming a colored insert in the shape of the mold from the colored plastic material, wherein the insert has a first end wall and a second end wall, said first end wall being parallel and equal in length to said second end wall, wherein said first end wall and said second end wall extend at substantially similar oblique angles from said bottom wall;

a first side wall and a second side wall, said first side wall being parallel and equal in length to said second side wall, wherein said first side wall and said second side wall extend at substantially similar oblique angles from said bottom wall, wherein said first end wall is integrally attached to said first side wall, said second side wall and said bottom wall and, said second end wall, is integrally attached to said first side wall, second side wall, and said bottom wall, a peripheral portion extending away from and in a plane parallel to said bottom wall wherein said peripheral portion is integrally connected to said first end wall, said first side wall, said second end wall, and said second side wall, forming a lip; and placing the colored insert inside the clear plastic floral box.

\* \* \* \* \*